(12) United States Patent
Lecoester et al.

(10) Patent No.: US 10,989,345 B2
(45) Date of Patent: Apr. 27, 2021

(54) PROCESS FOR BRAZING AN ACCESSORY ON A TUBE, AND CORRESPONDING ASSEMBLY

(71) Applicant: Faurecia Systemes D'Echappement, Nanterre (FR)

(72) Inventors: François Lecoester, Montbeliard (FR); Vincent Graber, Bavilliers (FR)

(73) Assignee: Faurecia Systemes D'Echappement

( * ) Notice: Subject to any disclaimer, the term of this patent is extended or adjusted under 35 U.S.C. 154(b) by 385 days.

(21) Appl. No.: 15/901,973

(22) Filed: Feb. 22, 2018

(65) Prior Publication Data

US 2018/0238481 A1 Aug. 23, 2018

(30) Foreign Application Priority Data

Feb. 23, 2017 (FR) ...................... 17 51428

(51) Int. Cl.
| | |
|---|---|
| *B23K 1/00* | (2006.01) |
| *F16L 55/00* | (2006.01) |
| *F16L 41/08* | (2006.01) |
| *B23K 33/00* | (2006.01) |
| *B23K 1/002* | (2006.01) |
| *F01N 13/18* | (2010.01) |

(52) U.S. Cl.
CPC .............. *F16L 55/00* (2013.01); *B23K 1/002* (2013.01); *B23K 1/0008* (2013.01); *B23K 33/006* (2013.01); *F16L 41/084* (2013.01); *F01N 13/1805* (2013.01)

(58) Field of Classification Search
CPC ...... B23K 35/3033; B23K 1/002; B23K 1/18; B23K 1/20; B23K 2101/06; B23K 33/006; B23K 35/34; B23K 3/0475
See application file for complete search history.

(56) References Cited

U.S. PATENT DOCUMENTS

| | | | | | |
|---|---|---|---|---|---|
| 2,876,740 | A | * | 3/1959 | Melas .................... | B43K 1/003 |
| | | | | | 346/140.1 |
| 2,900,253 | A | * | 8/1959 | Evans ................ | B23K 35/3033 |
| | | | | | 420/441 |
| 2005/0275219 | A1 | | 12/2005 | Hiyama et al. | |

FOREIGN PATENT DOCUMENTS

| | | |
|---|---|---|
| FR | 2135392 A1 | 12/1972 |
| JP | H07043094 A | 2/1995 |

OTHER PUBLICATIONS

Search Report for FR 1751428 dated Oct. 27, 2017.

\* cited by examiner

*Primary Examiner* — Erin B Saad
(74) *Attorney, Agent, or Firm* — Carlson, Gaskey & Olds, P.C.

(57) ABSTRACT

A brazing process includes placing an accessory on a tube and interposing a brazing material between a bearing surface of the tube and a complementary bearing surface of the accessory. The brazing material is melted. The bearing surface and the complementary bearing surface together define a chamber having a converging portion whose height perpendicular to the bearing surface decreases radially away from the orifice. The converging portion of the chamber has a radial width greater than one times the thickness of the tube, so that the brazing material is distributed by capillary action in the chamber, and binds the bearing surface and the complementary bearing surface to one another.

16 Claims, 4 Drawing Sheets

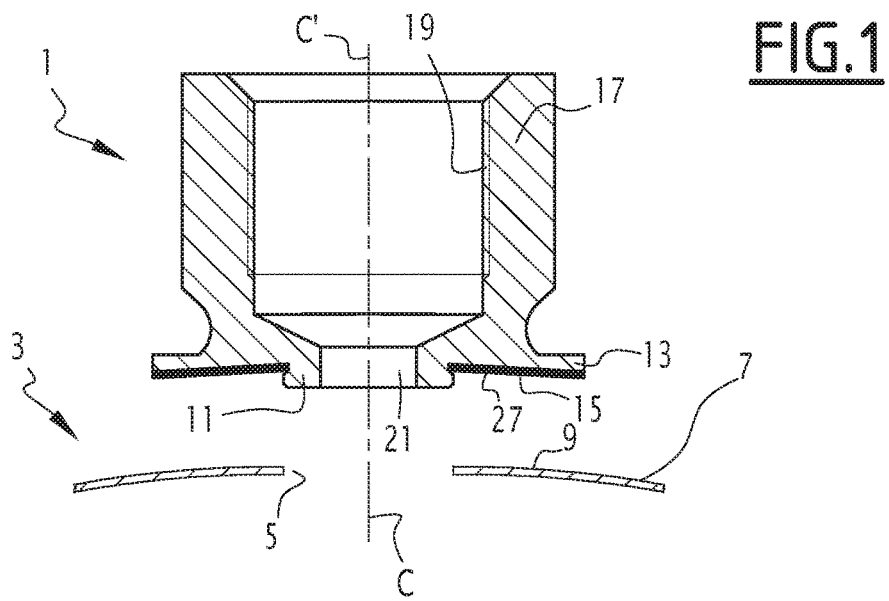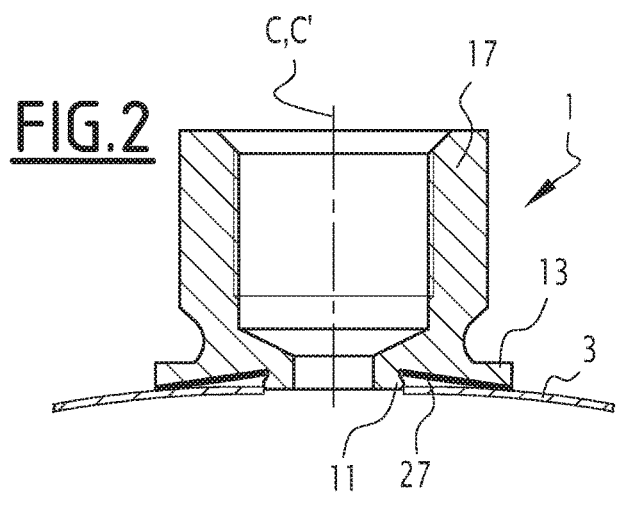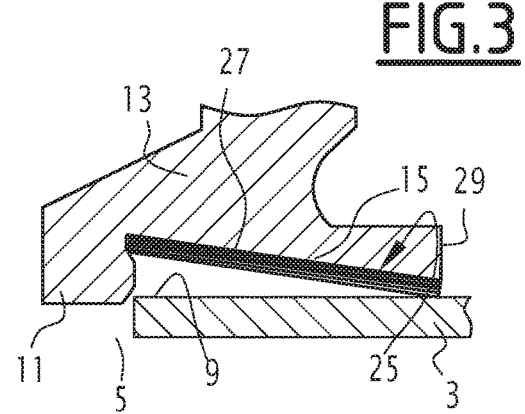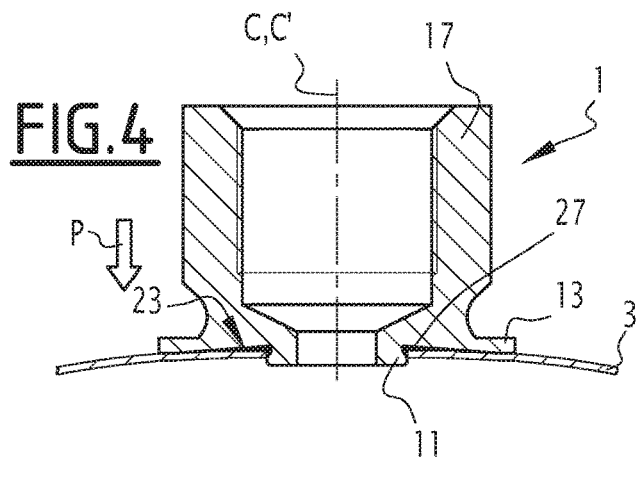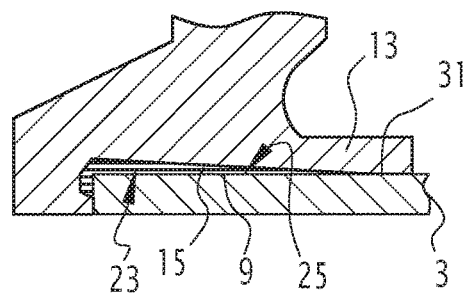

PROCESS FOR BRAZING AN ACCESSORY ON A TUBE, AND CORRESPONDING ASSEMBLY

CROSS-REFERENCE TO RELATED APPLICATIONS

This application claims priority to FR 17 51428, filed Feb. 23, 2017.

BACKGROUND OF THE INVENTION

The present invention generally relates to the brazing of parts on a thin tube.

It is known to fix an accessory on a tube using welding techniques such as MIG, MAG, or TIG. Such techniques cannot be used easily when the tube has a wall thickness of less than or equal to 0.6 mm. In fact, these techniques cause high energy transfer to the wall of the tube, which may lead to excessive deformation or to a fusion cut.

It is also possible to braze the accessory on the tube, in particular by using induction heating. A brazing material is interposed between the accessory and the tube. The brazing material is melted during heating. At that instant, the surfaces facing the accessory and the tube define a chamber. It is important to obtain a uniform distribution of the molten brazing material throughout the chamber in order to guarantee the quality of the connection between the accessory and the tube.

SUMMARY OF THE INVENTION

In this context, the invention aims to provide a brazing method for obtaining a good distribution of the brazing material in the chamber.

To this end, according to a first aspect, the invention provides a method of brazing an accessory to a tube, wherein the method comprises the following steps:
  providing a tube having an orifice, wherein the tube has a bearing surface on an outer surface surrounding the orifice to give the tube a thickness;
  providing an accessory having a central portion and a peripheral portion surrounding the central portion, wherein the peripheral portion has a complementary bearing surface;
  placing the accessory on the tube so that the central portion engages in the orifice, wherein the complementary bearing surface is placed opposite the bearing surface and a brazing material is interposed between the bearing surface and the complementary bearing surface; and melting the brazing material, wherein the bearing surface and the complementary bearing surface together define a chamber having a converging portion whose height perpendicular to the bearing surface decreases radially away from the orifice, wherein the converging portion of the chamber has a radial width greater than one times the thickness of the tube, so that the brazing material is distributed in the chamber by capillary action and binds the bearing surface and the complementary bearing surface to one another.

Due to the shape of the convergent portion of the chamber, the brazing material is distributed by capillary action throughout the chamber. In particular, it progresses from an inner radial zone of the chamber towards an outer radial zone because the height of the chamber decreases in this direction.

Furthermore, the method may have one or more of the following features considered individually or in any technically feasible combination:
  the chamber extends to an outer radial edge of the peripheral portion;
  the complementary bearing surface forms an angle between 2° and 20°, preferably between 3° and 12°, with the bearing surface;
  the brazing material is mounted on the accessory before the accessory is placed on the tube;
  the brazing material comprises at least one flat ring cut from a sheet of brazing material, preferably 1 to 10 rings, more preferably 1 to 5 rings;
  the, or each, ring is fixed to the central part of the accessory;
  the brazing material is a nickel-based alloy;
  the tube has a thickness of between 0.5 mm and 1.2 mm;
  the peripheral part is a collar with a thickness of between 0.8 mm and 2 mm, preferably between 1 mm and 1.4 mm;
  the complementary bearing surface extends radially inwards via a groove in the central part;
  the groove has a depth of between 0.1 mm and 0.5 mm, preferably between 0.1 mm and 0.3 mm;
  the tube comprises a boss protruding outwards from the tube and with a top forming a flat plate, wherein the orifice is formed in the plate, and wherein an outer edge of the plate is separated from the outer radial edge of the peripheral portion by a spacing of less than 2 mm, preferably less than 1 mm;
  the tube comprises a hollow depression towards the inside of the tube, a bottom of which forms a flat plate, wherein the orifice is formed in the plate, while the outer radial edge of the peripheral portion is separated from an outer edge of the plate by a spacing of less than 3 mm, preferably less than 2 mm;
  the tube has at least one stiffening relief around the plate;
  the converging portion of the chamber has a radial width greater than twice the thickness of the tube, preferably greater than three times the thickness of the tube.

According to a second aspect, the invention provides an assembly comprising:
  a tube having an orifice, wherein the tube has a bearing surface on an outer surface surrounding the orifice, wherein the tube has a thickness;
  an accessory having a central portion and a peripheral portion that surrounds the central portion, wherein the peripheral portion has a complementary bearing surface;
  as the central portion is engaged in the orifice and the complementary bearing surface is placed opposite the bearing surface, the bearing surface and the complementary bearing surface together define a chamber having a converging portion whose height perpendicular to the bearing surface decreases radially away from the orifice, while the converging portion of the chamber has a radial width greater than one times the thickness of the tube;
  a brazing material placed in the chamber binds the bearing surface and the complementary bearing surface to one another.

The tube and the accessory may have one or more of the features set forth above.

BRIEF DESCRIPTION OF THE DRAWINGS

Other features and advantages of the invention will emerge from the detailed description that is given below for information only and is in no way limitative, with reference to the appended figures, wherein:

FIG. 1 shows a schematic representation of an accessory to be fixed in the orifice of a tube, before placing the accessory on the tube;

FIG. 2 shows a representation similar to that of FIG. 1 after placing the accessory on the tube, FIG. 3 shows an enlarged view of the chamber in which the brazing material is placed;

FIG. 4 shows a representation similar to that of FIG. 2, showing the accessory and the tube after heating;

FIG. 5 shows an enlarged view of the edge of the brazing chamber for an alternative embodiment of the invention and showing the accessory and the tube after heating;

DETAILED DESCRIPTION

Figure 6:
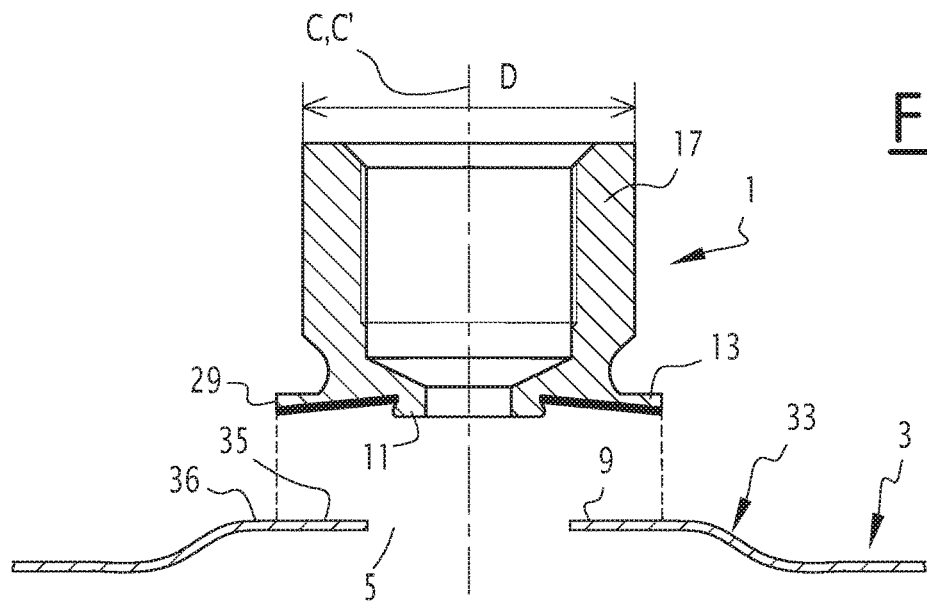
FIG. 6 shows an alternative embodiment of the invention in which a plate is formed at the top of a boss projecting outwards from the tube.

The method shown in particular in FIGS. 1 to 5 is intended to braze an accessory 1 to a tube 3. In the example shown, the accessory 1 is a support intended to receive a probe, for example a probe for measuring temperature or pressure. Alternatively, the accessory may be a nozzle, or any other type of accessory intended to be fixed in or around an orifice of the tube 3, for example a urea injector, a fuel vaporizer, or a support for a valve bearing.

The tube 3 is typically an element of a vehicle exhaust line. The vehicle is typically a motor vehicle equipped with a heat engine, for example a car or a truck.

The tube 3 is, for example, a pipe connecting two elements of the exhaust line to one another. Alternatively, the tube 3 may be a tubular envelope in which is housed a member of the exhaust line such as an exhaust gas purifying member, a heat exchanger, a valve, or any other member.

The tube 3, perpendicular to its central axis, may have any kind of section. For example, it may have a circular, elliptical, or rectangular section.

The tube 3 may also be curved.

The method comprises a step during which the tube 3 is provided and wherein this tube 3 has an orifice 5. The tube 3 has on its outer surface 7 a bearing surface 9 surrounding the orifice 5. The orifice has a central axis C.

The bearing surface 9 typically has an annular shape and surrounds the orifice 5 over its entire periphery. It is adjacent to the orifice 5. It is centered on the central axis C.

The tube 3 has a given thickness, typically between 0.5 and 1.2 mm.

The tube 3 is typically made of steel, for example a ferritic or austenitic stainless steel, such as ferritic grades 1.4510 and 1.4509 and austenitic grade 1.4301.

The method also comprises a step during which the accessory 1 is provided.

As may be seen in FIG. 1, the accessory 1 comprises a central portion 11 and a peripheral portion 13 surrounding the central portion 11.

The peripheral portion 13 has a complementary bearing surface 15.

The complementary bearing surface 15 typically has an annular shape. It completely surrounds the central portion 11. It has a central axis C'.

Typically, the peripheral portion 13 is a collar. The main portion 11 protrudes from the side of the peripheral portion 13 where the complementary bearing surface 15 is formed.

In the example shown in the figures, the accessory 1 is a probe support. On the side of the peripheral portion 13 opposite the complementary bearing 15, it comprises a drum 17 having an internal tapping 19. The tapping 19 has a central axis substantially perpendicular to the peripheral portion 13 aligned on the axis C'. The tapping 19 is extended axially by an orifice 21 completely traversing the peripheral portion 13 and the central portion 11.

The central portion 11 has an outer section with a shape substantially corresponding to the inner section of the orifice 5. Typically, this section is circular.

The method also comprises a step during which the accessory 1 is placed on the tube 3, wherein the central portion 11 is engaged in the orifice 5, and the bearing surface 9 is placed opposite the complementary bearing surface 15, while a brazing material 27 is interposed between the bearing surface 9 and the complementary bearing surface 15. The situation at the end of this step is shown in FIG. 2.

The axes C and C' are substantially merged. In the example shown, the bearing surface 9 is kept away from the complementary bearing surface 15 by the brazing material 27.

By "substantially" is meant a difference of less than 8°, and preferably less than 2°.

In a variant, the axes C and C' are merged.

The method also comprises a step of melting the brazing material 27.

After melting the brazing material, the bearing surface 9 and the complementary bearing surface 15 that are placed opposite each other, together define a chamber 23 having a converging portion 25 whose height perpendicular to the bearing surface 9 decreases radially away from the orifice 5.

The radial direction is understood here to mean relative to the central axis C.

Figure 11:
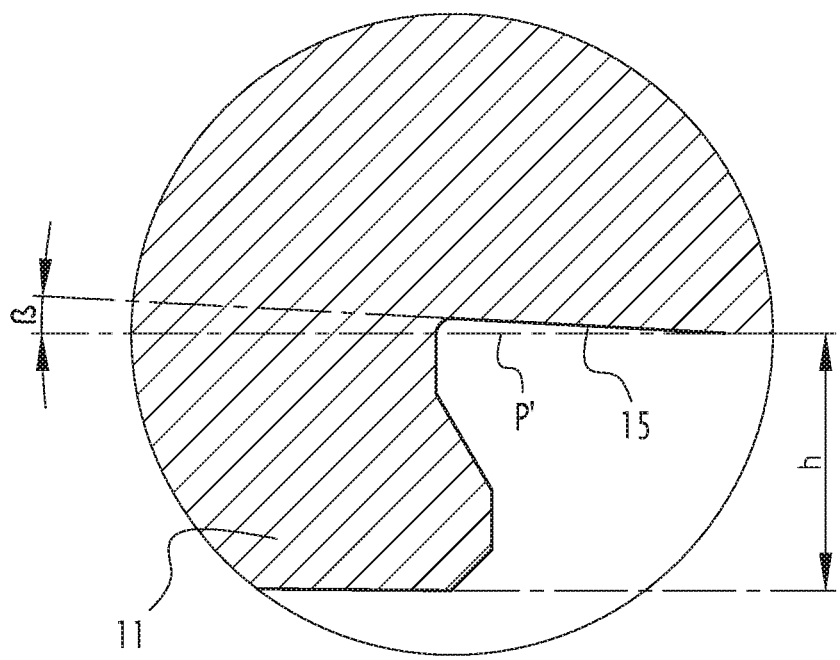
Figure 12:
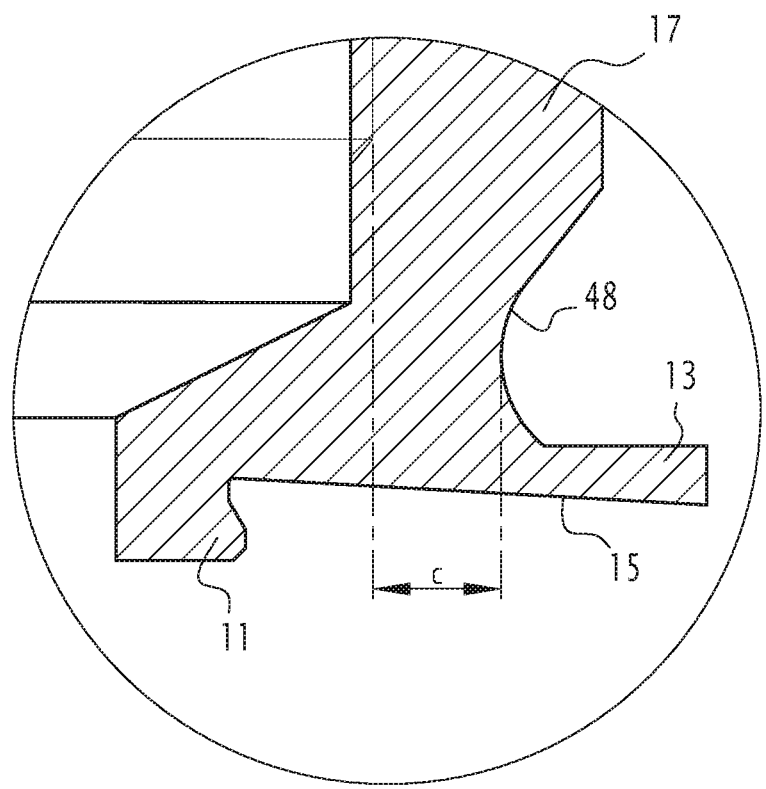

For this purpose, the complementary bearing surface 15 forms with the bearing surface 9 an angle β of between 2° and 20°, preferably between 3° and 12°. This angle is shown in FIG. 11.

The angle β also corresponds to the angle between the complementary bearing surface 15 and a plane that is substantially perpendicular to the axis C'.

After melting, the brazing material 27 is distributed in the chamber 23 by capillary action. After cooling, it binds the bearing surface 9 and the complementary bearing surface 15 to one another.

A small portion of the brazing material 27 may exit the chamber 23 to form a meniscus around the accessory 1.

Once the brazing material 27 is melted and distributed in the chamber 23, the chamber 23 is substantially closed.

By this is meant that, at the outer radial end of the chamber 23, the bearing surface 9 is in contact with, or in the immediate vicinity of, the complementary bearing surface 15.

The shape of the chamber 23, and more particularly the presence of the converging portion 25, ensures good distribution of the brazing material 27 throughout the chamber. The propagation of the radially-fused brazing material is facilitated by the fact that the height of the converging portion is reduced in this direction.

The chamber 23, and more precisely the converging portion 25 of the chamber 23, preferably extends to an outer radial edge 29 of the peripheral portion 13, as shown in FIG. 3.

In an alternative embodiment shown in FIG. 4, the chamber 23 does not extend to the outer radial edge 29 of the peripheral portion. In this case, the outer radial zone 31 of the complementary bearing surface 15 is substantially parallel to the corresponding area of the bearing surface 9, and is therefore pressed against the bearing surface 9 once the accessory 1 is in place on the tube 3.

The converging portion 25 of the chamber 23 has a radial width greater than one times the thickness of the tube, preferably greater than three times the thickness of the tube. This ensures that the connection zone between the accessory 1 and the tube 3 is sufficiently large, and that the brazed connection is sufficiently strong.

The zone 31 of the complementary bearing surface 15 that is substantially parallel to the corresponding zone of the bearing surface 9 has a maximum radial width of one times the thickness of the tube.

Preferably, the brazing material 27 comprises at least one flat ring cut from a sheet of brazing material. Typically, it comprises between one and ten flat rings, and even more preferably between one and five flat rings. Each ring has a thickness less than 50 µm.

As shown in FIG. 1, these rings are initially mounted around the central portion 11. The rings are fixed to the accessory 1 either by having a complementary shape between the central orifice of the ring and the central portion 11, or are fixed by welding points.

Typically, the brazing material 27 is mounted on the accessory 1 before the accessory 1 is placed on the tube 3.

Thus, when the accessory 1 is placed on the tube 3, the brazing material 27 is placed between the bearing surface 9 and the complementary bearing surface 15.

Alternatively, the brazing material 27 is pre-positioned on the tube 1 before mounting the accessory 1 on the tube, 3 or is brought independently between the bearing surface 9 and the complementary bearing surface 15.

Advantageously, the brazing material 27 is a nickel-based alloy.

In fact, the use of a copper alloy is not possible for parts of the exhaust line whose temperature may reach more than 800° C. in operation. In contrast, nickel alloys withstand such temperatures.

Preferably, the brazing material sheets are obtained by a method comprising a high-speed cooling step that imparts an amorphous structure to the material. The sheet of nickel alloy brazing material thus obtained is flexible, and may be shaped easily. On the other hand, such a method makes it possible to obtain sheets only having a thickness of less than 50 µm. Therefore, a plurality of flat rings cut in such sheets is used in order to obtain the desired mass of brazing material for the intended application.

Preferably, the brazing material is a nickel-based alloy with a composition comprising: chromium 15%, silicon 7.3%, carbon less than 0.06%, boron 1.4%, and the balance being nickel.

The melting of the brazing material 27 is typically obtained by heating. The temperature of the accessory 1, the tube 3 and the brazing material 27 is raised so that the brazing material melts.

Typically, the heating is performed by induction. Alternatively, it may be performed by any other suitable method.

To improve the contact between the accessory 1 and the tube 3 and thus to reduce the space between the bearing surface 9 and the complementary bearing surface 15, a pressure P forcing the accessory 1 against the tube 3 is applied during heating, as shown in FIG. 4. This pressure is exerted in a direction substantially corresponding to the central axis C.

The intensity of the pressure exerted depends on the particular case, and in particular on the thickness of the tube 3.

Such a solution is generally only usable for tubes having a thickness greater than 0.6 mm, preferably greater than or equal to 0.8 mm.

For tubes having a thickness less than or equal to 0.6 mm, such pressure may eventually lead to the collapse of the bearing surface 9 towards the inside of the tube 3.

If the pressure P causes a collapse, one solution is to increase the rigidity of the tube 3 around the orifice 5.

In a first embodiment shown in FIG. 6, the tube 3 comprises for this purpose a boss 33 projecting outwards from the tube. The boss 33 has a top forming a flat plate 35, while the orifice 5 is formed in the plate 35, preferably in the center of the plate 35.

The outer edge 36 of the plate is separated from the outer radial edge 29 of the peripheral portion 13 by a gap of less than 2 mm, preferably less than 1 mm.

Figure 7:
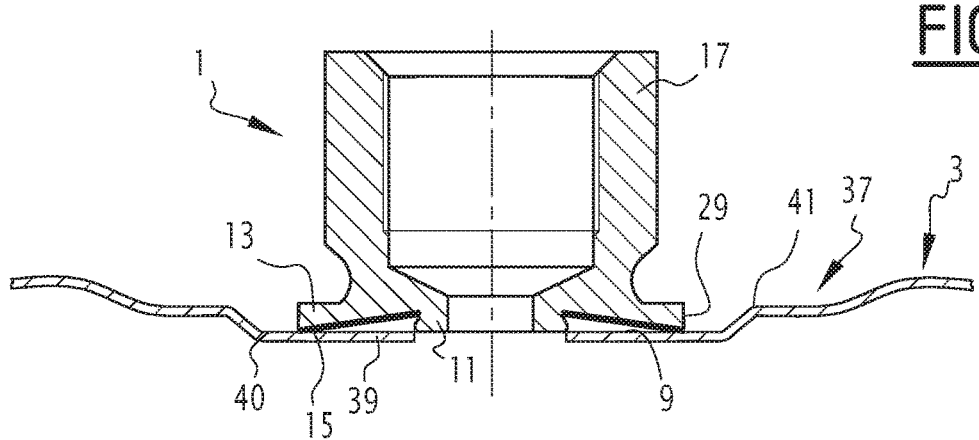
FIGS. 7 and 8 show another embodiment of the invention, wherein a plate is formed at the bottom of a recessed depression towards the inside of the tube.
Figure 8:
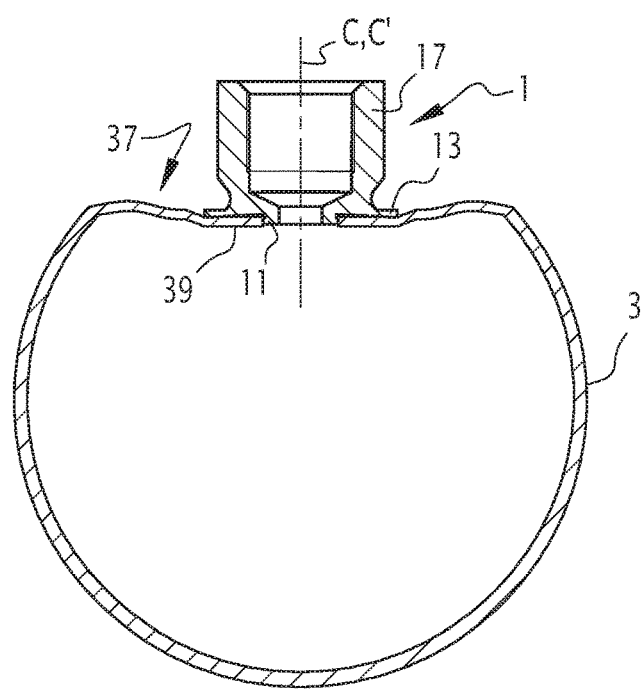
Figure 9:
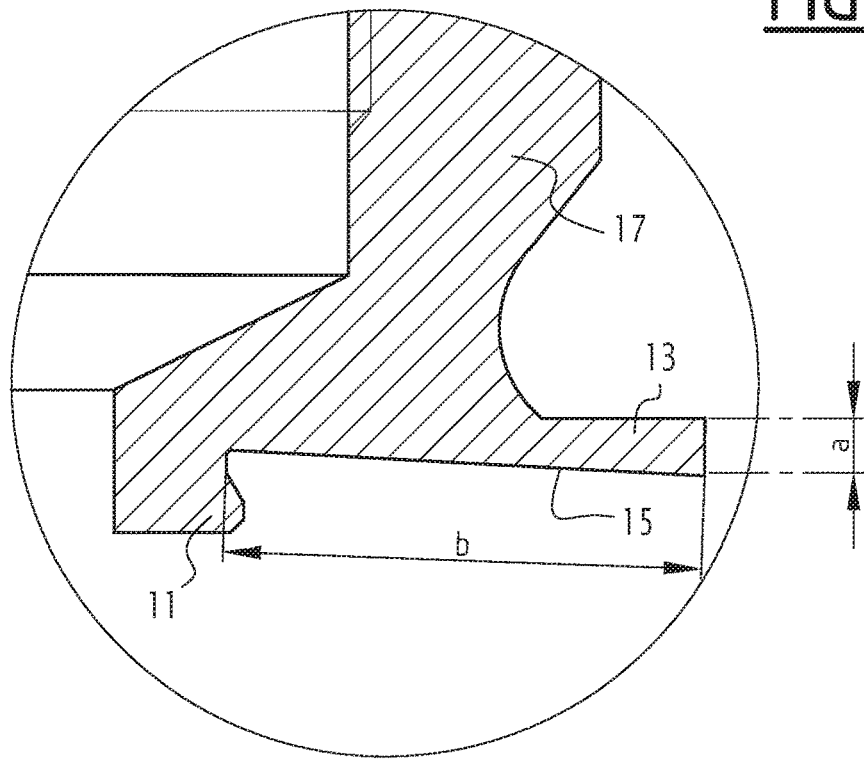
FIGS. 9 to 12 show enlarged views of details of the accessory, illustrating the main dimensions thereof.

In a variant, as illustrated in FIGS. 7 and 8, the tube comprises a depression 37 hollowed towards the inside of the tube, a bottom of which forms a flat plate 39.

The orifice 5 is formed in the plate 39, preferably in the center thereof.

The outer radial edge 29 of the peripheral portion 13 is separated from the outer edge 40 of the plate by a spacing of less than 3 mm, preferably less than 2 mm.

In both cases, it is important that the spacing between the outer radial edge of the peripheral portion 13 and the outer edge of the plate is extremely small. In fact, if the plate is significantly smaller than the peripheral portion, it is not possible to ensure that there is no space between the bearing surface 9 and the complementary bearing surface 15 during heating. On the contrary, if the plate is of a size substantially larger than the peripheral portion 13, the edge of the orifice 5 may collapse when the pressure is applied in the heating step.

In the case where the tube 3 comprises a depression 37 and if the rigidity of the tube 3 is still not sufficient to prevent collapse of the edge of the orifice during the application of the pressure, it is advantageous to form at least one stiffening relief in the tube around the plate. In FIGS. 7 and 8, the stiffening relief is a step 41, surrounding the plate 39. The step 41 descends towards the plate 39. Alternatively, it may rise towards the plate 39.

A step height between 0.5 and 1.5 mm is typically sufficient to stiffen the tube 3 around the plate 39.

FIGS. 9 to 12 illustrate the preferred dimensional characteristics of the accessory 1.

Typically, the peripheral portion 13 has a thickness of between 1 and 1.4 mm. If the thickness "a" is less than 1 mm, the peripheral portion may be too fragile, and could for example deform in the event of a fall or shock of the accessory.

Such deformation could prevent the brazing from being of sufficient quality, in particular by creating a space between the bearing surface 9 and the complementary bearing surface 15 that would be capable of attenuating the capillary action and thus hindering the homogeneous distribution of the brazing material.

If the thickness of the peripheral portion 13 is too great, the heat energy required for the brazing material 27 to reach the required temperature could be excessive, and this could lead to deformation of the tube 3 around the orifice 5.

The radial width "b" of the complementary bearing surface 15 is typically greater than one times, preferably greater than twice, and even more preferably greater than three times the thickness of the tube. There is no upper limit for the radial width "b", apart from the constraint of limiting the amount of material needed to manufacture the accessory.

Figure 10:
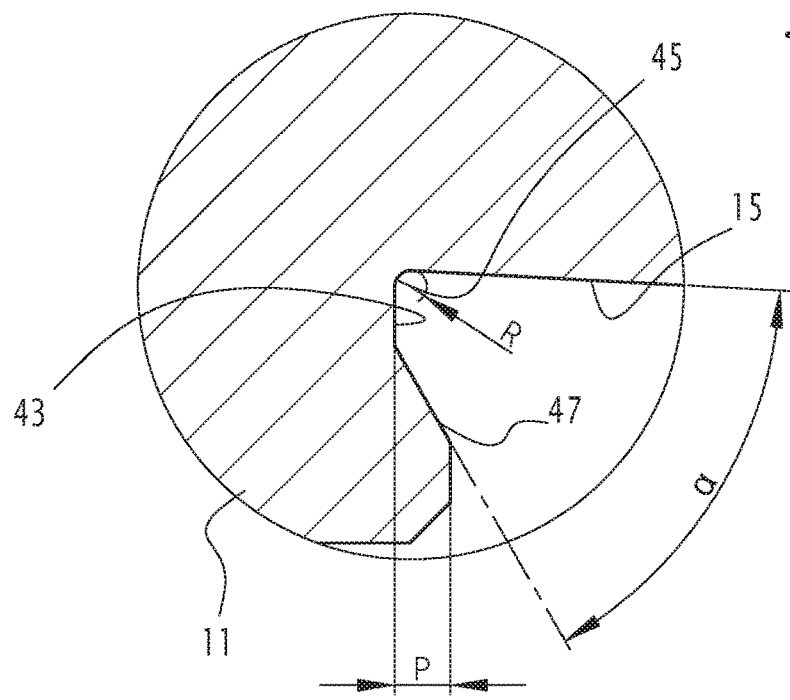

As may be seen in particular in FIG. 10, the complementary bearing surface 15 extends radially inwards through a groove 43 hollowed out in the central portion 11. The radial depth "p" of the groove 43 lies between 0.1 mm and 5 mm, preferably between 0.1 mm and 0.3 mm. The groove 43 and the complementary bearing surface 15 are connected to each other by a fillet 45 with a radius R between 0.1 mm and 0.5 mm, preferably between 0.1 mm and 0.3 mm. The groove 43 is delimited towards the free end of the central portion 11 by a frustoconical surface 47. The angle α between the complementary bearing surface 15 and the frustoconical surface 47 is of the order of 60°.

The depth of the groove 43 is chosen to allow the mounting of the brazing material rings by simple mechanical engagement around the central portion 11 without risk of falling. The values of the parameters R and α are chosen to allow easy machining of the groove 43, without excessive wear of the manufacturing tools.

The axial height "h" of the central portion 11 is typically similar to the thickness of the tube 3. Typically, "h" lies between 0.4 mm and 2 mm. The height "h" is measured between a plane P', perpendicular to the central axis C' and in which is inscribed the radial outer edge of the complementary surface 15, and the free end of the central portion 11.

An external groove 48 is formed in the trunk 17 immediately above the radial portion 13. This makes it possible to reduce the thickness of the wall of the trunk 17 directly adjacent to the radial portion 13. Consequently, the thermal inertia of the accessory 1 and the thermal energy required to cause the brazing charge to melt are decreased. The cycle time is shortened. A wall thickness "c" of 2 mm in the bottom of the groove 48 is considered sufficient to ensure the mechanical strength of the accessory 3, without unduly penalizing the heating step.

The invention claimed is:

1. A method for brazing an accessory on a tube, comprising:
    providing a tube having an orifice, wherein the tube comprises a bearing surface surrounding the orifice on an outer surface of the tube, and wherein the bearing surface comprises a flat surface or an outwardly curved surface, and wherein the tube has a thickness;
    providing an accessory having a central portion defining a center axis and a peripheral portion surrounding the central portion, wherein the peripheral portion has a complementary bearing surface, wherein a portion of the complementary bearing surface is obliquely orientated relative to the center axis;
    placing the accessory on the tube, wherein the central portion is engaged in the orifice, while the complementary bearing surface is placed opposite the bearing surface, and a brazing material is interposed between the bearing surface on the outer surface of the tube and the complementary bearing surface;
    melting the brazing material, wherein the bearing surface and the complementary bearing surface together define a chamber having a converging portion whose height perpendicular to the bearing surface decreases radially away from the orifice, wherein the converging portion of the chamber has a radial width greater than one times the thickness of the tube, so that the brazing material is distributed by capillary action in the chamber, and binds the bearing surface and the complementary bearing surface to one another, and wherein the peripheral portion comprises a flange extending radially outward of an outer surface of the central portion relative to the center axis, and wherein a portion of the chamber is formed between the outer surface of the tube and the flange.

2. The method according to claim 1, wherein the complementary bearing surface forms an angle of between 2° and 20° with the bearing surface.

3. The method according to claim 1, wherein the brazing material is mounted on the accessory before the accessory is placed on the tube.

4. The method according to claim 3, wherein the brazing material comprises at least one flat ring cut from a sheet of brazing material.

5. The method according to claim 4, wherein the at least one flat ring is fixed to the central portion of the accessory.

6. The method according to claim 1, wherein the brazing material is a nickel-based alloy.

7. The method according to claim 1, wherein the thickness of the tube is between 0.5 mm and 1.2 mm.

8. The method according to claim 1, wherein the flange has a thickness between 0.8 mm and 2 mm.

9. The method according to the claim 1, wherein the complementary bearing surface extends radially inwards and defines a groove hollowed in the central portion.

10. The method according to claim 9, wherein the groove has a depth between 0.1 mm and 0.5 mm.

11. The method according to claim 1, wherein the tube comprises a boss protruding outwards from the tube and having a top forming a flat plate, wherein the orifice is formed in the flat plate, while an outer edge of the flat plate is separated from an outer radial edge of the peripheral portion by a gap of less than 2 mm.

12. The method according to claim 1, wherein the tube comprises a depression recessed inwards in the tube and a bottom forming a flat plate, wherein the orifice is formed in the flat plate, while an outer radial edge of the peripheral portion is separated from an outer edge of the flat plate by a spacing of less than 3 mm.

13. The method according to claim 12, wherein the tube has at least one stiffening relief around the flat plate.

14. The method according to claim 1, wherein the radial width is greater than twice the thickness of the tube.

15. The method according to claim 13, wherein the at least one stiffening relief comprises a step that surrounds the flat plate.

16. The method according to claim 1, wherein, on one side of the flange opposite the complementary bearing surface, the central portion comprises a drum having an internal tapping, and wherein on an opposite side of the flange, the central portion extends through the orifice such that the tapping is extended axially by an accessory orifice completely traversing the flange and the central portion.

* * * * *